United States Patent
Yakovlev et al.

(10) Patent No.: US 10,662,366 B2
(45) Date of Patent: May 26, 2020

(54) COMPOSITIONS AND METHODS FOR SERVICING SUBTERRANEAN WELLS

(71) Applicant: Schlumberger Technology Corporation, Sugar Land, TX (US)

(72) Inventors: Andrey Vladimirovich Yakovlev, Primorsk (RU); Mohan Kanaka Raju Panga, Sugar Land, TX (US); Valerie Gisele Helene Lafitte, Sugar Land, TX (US); Jazmin Godoy-Vargas, Missouri City, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 15/232,199

(22) Filed: Aug. 9, 2016

(65) Prior Publication Data
US 2018/0044569 A1    Feb. 15, 2018

(51) Int. Cl.
| | | |
|---|---|---|
| *E21B 21/00* | (2006.01) | |
| *C09K 8/40* | (2006.01) | |
| *C04B 28/04* | (2006.01) | |
| *C09K 8/467* | (2006.01) | |
| *C09K 8/42* | (2006.01) | |
| *C09K 8/528* | (2006.01) | |
| *C09K 8/035* | (2006.01) | |
| *C09K 8/46* | (2006.01) | |
| *C09K 8/516* | (2006.01) | |
| *E21B 33/14* | (2006.01) | |
| *E21B 37/00* | (2006.01) | |

(52) U.S. Cl.
CPC ............... *C09K 8/40* (2013.01); *C04B 28/04* (2013.01); *C09K 8/035* (2013.01); *C09K 8/424* (2013.01); *C09K 8/46* (2013.01); *C09K 8/467* (2013.01); *C09K 8/516* (2013.01); *C09K 8/528* (2013.01); *E21B 21/00* (2013.01); *E21B 33/14* (2013.01); *E21B 37/00* (2013.01); *C09K 2208/08* (2013.01); *Y02W 30/97* (2015.05)

(58) Field of Classification Search
None
See application file for complete search history.

(56) References Cited

U.S. PATENT DOCUMENTS

| | | |
|---|---|---|
| 4,341,807 A | 7/1982 | Turbak et al. |
| 4,374,702 A | 2/1983 | Turbak et al. |
| 4,378,381 A | 3/1983 | Turbak et al. |

(Continued)

FOREIGN PATENT DOCUMENTS

WO    2014148917 A1    9/2014

OTHER PUBLICATIONS

Chirayil et al., "Review of Recent Research in Nano Cellulose Preparation from Different Lignocellulosic Fibers", Rev.Adv.Mater. Sci., vol. 37, 2014, pp. 20-28.

(Continued)

*Primary Examiner* — Andrew Sue-Ako

(57) ABSTRACT

Well treatment compositions comprise water, a polysaccharide and cellulose fibers. The cellulose fibers may have lengths between 100 nm and 10 mm, and diameters between 4 nm and 40 µm. The compositions may be used as spacer fluids during well cementing operations. The spacer fluids may prevent commingling of a cement slurry with a drilling fluid. The drilling fluid may be water-base, oil-base, synthetic-base or an emulsion.

20 Claims, 5 Drawing Sheets

(56) References Cited

U.S. PATENT DOCUMENTS

| | | | |
|---|---|---|---|
| 4,439,328 A * | 3/1984 | Moity | C09K 8/035 507/103 |
| 4,452,721 A | 6/1984 | Turbak et al. | |
| 4,452,722 A | 6/1984 | Turbak et al. | |
| 4,464,287 A | 8/1984 | Turbak et al. | |
| 4,483,743 A | 11/1984 | Turbak et al. | |
| 4,487,634 A | 12/1984 | Turbak et al. | |
| 4,500,546 A | 2/1985 | Turbak et al. | |
| 5,904,208 A | 5/1999 | Ray et al. | |
| 6,117,226 A * | 9/2000 | Dial | C04B 40/0035 106/162.8 |
| 6,221,152 B1 | 4/2001 | Dial et al. | |
| 9,133,384 B2 | 9/2015 | Rincon-Torres et al. | |
| 2004/0244978 A1* | 12/2004 | Shaarpour | C09K 8/035 166/293 |
| 2009/0054269 A1* | 2/2009 | Chatterji | C09K 8/487 507/104 |
| 2013/0035263 A1 | 2/2013 | Laukkanen et al. | |
| 2013/0274149 A1 | 10/2013 | Lafitte et al. | |
| 2015/0072902 A1 | 3/2015 | Lafitte et al. | |
| 2017/0226399 A1 | 8/2017 | Shimaoka et al. | |
| 2017/0226407 A1 | 8/2017 | Homma et al. | |

OTHER PUBLICATIONS

Liimatainen et al., "Influence of Adsorbed and Dissolved Carboxymethyl Cellulose on Fibre Suspension Dispersing, Dewaterability, and Fines Retention", BioResources.com, vol. 4, No. 1, 2009, pp. 321-340.

Ahola et al., "Effect of Polymer Adsorption on Cellulose Nanofibers Water Binding Capacity and Aggregation", BioResources.com, vol. 3, No. 4, 2008, pp. 1315-1328.

Daccord et al., "Mud Removal," in Nelson EB and Guillot D (eds.): Well Cementing—2nd Edition, Houston: Schlumberger, Chapter 5, 2006, pp. 143-189.

Peng et al., "Chemistry and Applications of Nanocrystalline Cellulose and its Derivatives: A Nanotechnology Perspective," The Canadian Journal of Chemical Engineering, vol. 89, No. 5, 2011, pp. 1191-1206.

International Search Report and Written Opinion issued in International Patent Appl. No. PCT/US2017/045658 dated Nov. 17, 2017; 14 pages.

International Preliminary Report on Patentability issued in International Patent Appl. No. PCT/US2017/045658 dated Feb. 21, 2019 (11 pages).

* cited by examiner

COMPOSITIONS AND METHODS FOR SERVICING SUBTERRANEAN WELLS

BACKGROUND

The statements in this section merely provide background information related to the present disclosure and may not constitute prior art.

This disclosure relates to compositions and methods for completing subterranean wells, in particular, fluid compositions and methods for completion operations during which the fluid compositions are pumped into a wellbore and make contact with subterranean rock formations.

In the course of completing oil and gas wells and the like, various types of fluids are circulated in the wellbore. These fluids include, but are not limited to, drilling fluids, spacer fluids, cement slurries and gravel-packing fluids. In addition, these fluids typically contain solid particles.

Cement slurries are frequently incompatible with most drilling fluids, particularly oil-based (OBM) and synthetic (SBM) fluids. If the cement slurry and drilling fluid commingle, a highly viscous mass may form that can cause several problems. In this application, commingling is defined as any direct contact between a drilling fluid and a cement slurry. Cement slurry can channel through the viscous mass, preventing bonding of the cement slurry to casing and formation surfaces. Unacceptably high friction pressures can develop during the cement job that may result in fracturing the formation or the development of lost circulation problems. If the viscous mass is sufficiently severe, the annulus may become plugged, terminating cement displacement. Any of these consequences would lead to job failure, compromising zonal isolation and possibly forcing operators to perform costly remedial operations. Plugging of the annulus can result in job failure. In each of these situations, zonal isolation may be compromised, and expensive remedial cementing may be required.

Consequently, intermediate fluids called preflushes are often pumped as buffers to prevent contact between cement slurries and drilling fluids. Preflushes can be chemical washes that contain no solids or spacer fluids that contain solids and can be mixed at various densities.

Spacers are preflushes with carefully designed densities and rheological properties. Spacers are more complicated chemically than washes. Viscosifiers may be employed in spacer fluids to suspend the solids and control the rheological properties. Examples of viscosifiers include water-soluble polymers or clays, or both. Other chemical components include dispersants, fluid-loss control agents, weighting agents, clays, antifoam agents, solvents and surfactants. A thorough discussion concerning the uses and compositions of preflushes may be found in the following publication. Daccord G, Guillot D and Nilsson F: "Mud Removal," in Nelson E B and Guillot D (eds.): *Well Cementing*—2$^{nd}$ *Edition*, Houston: Schlumberger (2006) 183-187.

For optimal fluid displacement, the density and viscosity of a spacer fluid are carefully designed. Specifically, the density of a spacer fluid may be higher than that of the drilling fluid and lower than that of the cement slurry. Furthermore, the viscosity of the spacer fluid may be designed to be higher than the drilling fluid and lower than the cement slurry. The spacer fluid may remain stable throughout the circulation process (i.e., no free-fluid development and no sedimentation of solids). Such stability is particularly desired when the well is highly deviated or horizontal. In addition, the fluid-loss rate may be controlled.

Another function of preflushes is to leave the casing and formation surfaces water wet, thereby promoting optimal bonding with the cement. Achieving water-wet surfaces may be challenging, especially when the drilling fluid has been non-aqueous. Such non-aqueous fluids (NAF) may be oil-base muds or emulsion muds whose external phase is oil-base. For these circumstances, special dispersant, solvent and surfactant systems have been developed by the industry. Designing a dispersant/solvent/surfactant system for a particular well may be complicated because several parameters are considered, including the base oil of the NAF, the presence of emulsifiers, the fluid density, bottomhole temperature, presence of brine salts and the chemical nature of the cement system.

SUMMARY

In an aspect, embodiments relate to well treatment compositions comprising water, a polymer and cellulose fibers.

In a further aspect, embodiments relate to methods for treating a subterranean well. The methods comprise preparing a composition that comprises water, a water soluble polymer and cellulose fibers. The composition is then placed in the well.

In yet a further aspect, embodiments relate to methods for cementing a subterranean well. The methods comprise preparing a composition that comprises water, a water soluble polymer and cellulose fibers. The composition is then placed in the well, followed by the placement of a cement slurry. The composition separates the cement slurry and a drilling fluid, and prevents commingling of the cement slurry and the drilling fluid.

In yet a further aspect, embodiments relate to methods for cleaning tubular and formation surfaces in a subterranean well. The methods comprise preparing a composition that comprises water, a water soluble polymer and cellulose fibers, The composition is then placed in the well such that it flows past casing and formation surfaces, thereby removing residual deposits and leaving the casing and formation surfaces water wet. The composition is then removed from the well.

DETAILED DESCRIPTION

Figure 1A:
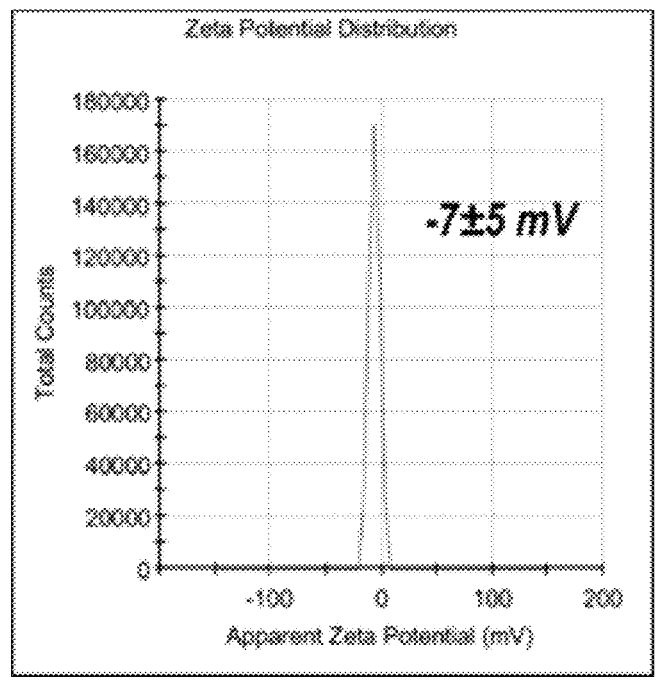
FIGS. 1a and 1b are zeta potential plots generated from aqueous suspensions of cellulose fibers with and without carboxymethyl cellulose.

At the outset, it should be noted that in the development of any such actual embodiment, numerous implementation-specific decisions are made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary of the disclosure and this detailed description, each numerical value should be read once as modified by the term "about" (unless already expressly so modified), and then read again as not so modified unless otherwise indicated in context. The term about should be understood as any amount or range within 10% of the recited amount or range (for example, a range from about 1 to about 10 encompasses a range from 0.9 to 11). Also, in the summary and this detailed description, it should be understood that a concentration range listed or described as being useful, suitable, or the like, is intended that any concentration within the range, including the end points, is to be considered as having been stated. For example, "a range of from 1 to 10" is to be read as indicating each possible number along the continuum between about 1 and about 10. Furthermore, one or more of the data points in the present examples may be combined together, or may be combined with one of the data points in the specification to create a range, and thus include each possible value or number within this range. Thus, even if specific data points within the range, or even no data points within the range, are explicitly identified or refer to a few specific, it is to be understood that inventors appreciate and understand that any data points within the range are to be considered to have been specified, and that inventors possessed knowledge of the entire range and the points within the range.

The present inventors have discovered spacer fluid compositions with improved solids suspension abilities. A synergistic effect in terms of spacer fluid stability has been observed when a water soluble polymer is combined with cellulose fibers (CF). CF may contain some amount of cellulose nanofibers (CNF). Spacer fluids that contain either CF or a water soluble polymer alone may display sedimentation or phase separation. However, when the water soluble polymer and CF are combined, the spacer fluids are stable. This phenomenon will be illustrated in the foregoing examples.

For each aspect, the dimensions of the CF may between 100 nm and 10 mm in length, and between 4 nm and 40 μm in diameter. Or the dimensions may be between 1 μm and 1 mm in length, and between 10 nm and 1 μm in diameter. Or the dimensions may be between 50 μm and 500 μm in length, and between 50 nm and 500 nm in diameter.

CNF (a subset of CF) is a material composed of nanosized cellulose fibrils with a high aspect ratio such as, for example, between about 30 and about 300, or between about 60 and about 155. The lateral dimensions may be between a few nanometers and a few micrometers, and the longitudinal dimension may vary widely, up to several millimeters.

For each aspect, the dimensions of the CF may between 100 nm and 10 mm in length, and between 4 nm and 40 μm in diameter. Or the dimensions may be between 1 μm and 1 mm in length, and between 10 nm and 1 μm in diameter. Or the dimensions may be between 50 μm and 500 μm in length, and between 50 nm and 500 nm in diameter.

Fluids containing CNF may be pseudoplastic and exhibit thixotropic properties. The fibrils may be isolated from any cellulose containing source, including wood pulp, through high-pressure, high-temperature and high velocity impact homogenization, grinding or microfluidization. More information concerning CNF may be found in the following publication. Peng B L, Dhar N, Liu H L and Tam K C: "Chemistry and applications of nanocrystalline cellulose and its derivatives: A nanotechnology perspective," *The Canadian Journal of Chemical Engineering* 89 (5): 1191-1206.

The CF may be present at a concentration between 0.01% and 10% by weight of water (BWOW), or between 0.1% and 3% BWOW or between 0.5 and 1% BWOW.

Cellulose fibers and their derivatives constitute one of the most abundant renewable polymer resources. A specific type of cellulose, referred to as nanocellulose, has recently found utility in several industries. Nanocellulose may refer to at least three different types of nanocellulose materials, which vary depending on the fabrication method and the source of the natural fibers. These three types of nanocellulose materials are: nanocrystalline cellulose (NCC), microfibrillated cellulose (MFC), and bacterial cellulose (BC), which are described below. Additional details regarding these materials are described in U.S. Pat. Nos. 4,341,807, 4,374,702, 4,378,381, 4,452,721, 4,452,722, 4,464,287, 4,483,743, 4,487,634 and 4,500,546, the disclosures of each of which are incorporated by reference herein in their entirety.

Nanocellulose materials have a repetitive unit of β-1,4 linked D glucose units, as seen in the following chemical structure.

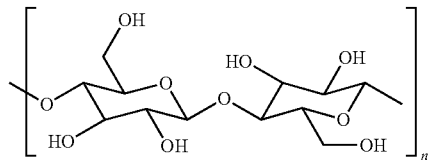

The integer values for the variable n relate to the length of the nanocellulose chains, which generally depends on the source of the cellulose and even the part of the plant containing the cellulosic material.

In some embodiments, n may be an integer from about 100 to about 10,000, from about 1,000 to about 10,000, or from about 1,000 to about 5,000. In other embodiments, n may be an integer from about 5 to about 100. In other embodiments, n may be an integer from about 5000 to about 10,000.

NCC, also referred to as cellulose nanocrystals, cellulose whiskers, or cellulose rod-like nanocrystals, may be produced from cellulose fibers, as described in U.S. Patent Application Pub. No. 2013/0274149, which is incorporated by reference herein in its entirety. However, cellulose nanocrystals may have shapes other than rods. Examples include nanocrystals in the shape of a 4- to 8-sided polygon, such as a rectangle, hexagon or octagon. NCCs may be manufactured via the hydrolysis of cellulose fibers from various sources such as cotton, wood and wheat straw, and cellulose from algae and bacteria. These cellulose fibers are characterized in having two distinct regions—an amorphous region and a crystalline region. In embodiments, NCC can be prepared through acid hydrolysis of the amorphous regions of cellulose fibers that have a lower resistance to acid attack as compared to the crystalline regions of cellulose fibers. Consequently, NCC particles with "rod-like" shapes (herein after referred to as "rod-like nanocrystalline cellulose particles" or more simply "NCC particles") having a crystalline structure are produced. In embodiments, the hydrolysis process may be conducted under mild conditions such that the process does not result in any considerable degradation or decomposition rod-like crystalline portion of the cellulose.

In some embodiments, NCC may be prepared through acid hydrolysis of the amorphous and disordered paracrystalline regions of cellulose fibers that have a lower resistance to acid attack as compared to the crystalline regions of cellulose fibers. During the hydrolysis reaction, the amorphous and disordered paracrystalline regions of the cellulose fibers are hydrolyzed, resulting in the removal of microfibrils at the defects. This process also results in rod-like nanocrystalline cellulose particles or more simply "NCC particles" having a crystalline structure.

The NCC particles may be exceptionally tough, with a strong axial Young's modulus (150 GPa) and may have a morphology and crystallinity similar to the original cellulose fibers (except without the presence of the amorphous portion). In some embodiments, the degree of crystallinity can vary from about 50% to about 100%, such as from about 65% to about 85%, or about 70% to about 80% by weight. In some embodiments, the degree of crystallinity may be between about 85% and about 100%, or between about 88% and about 95% by weight.

Techniques that are commonly used to determine NCC particle size include scanning electron microscopy (SEM), transmission electron microscopy (TEM) and atomic force microscopy (AFM). Wide-angle x-ray diffraction (WAXD) may be used to determine the degree of crystallinity.

In some embodiments, the NCCs or NCC particles may have a surface that is closely packed with hydroxyl groups, which allows for chemical modifications to be performed on their surfaces. In embodiments, some of the hydroxyl groups of the NCC or NCC particles may have been modified or converted prior to, during, and/or after introduction into the wellbore, such as to a sulfate ester group, during acid digestion. In some embodiments, some of the hydroxyl groups of the NCC or NCC particles surface may have been modified or converted to be carboxylated.

In embodiments, the method of preparing the NCCs or NCC particles (and thus the resultant functional groups present on the surface of the NCCs or NCC particles) may be chosen to tailor the specific properties of the fluids comprising the NCCs or NCC particles. For example, fluids comprising NCCs or NCC particles may display a thixotropic behavior or antithixotropic behavior, or no time-dependent viscosity. For instance, fluids incorporating hydrochloric acid-treated NCCs or NCC particles may possess thixotropic behavior at concentrations above 0.5% (w/v), and antithixotropic behavior at concentrations below 0.3% (w/v), whereas fluids incorporating sulfuric acid treated NCCs or NCC particles may show no time-dependent viscosity.

In embodiments, the NCC or NCC particles may be functionalized to form a functionalized NCC particle, such as a functionalized NCC particle in which the outer circumference of the nanocrystalline cellulose has been functionalized with various surface modifiers, functional groups, species and/or molecules. For example, such chemical functionalizations and/or modifications may be conducted to introduce stable negative or positive electrostatic charges on the surfaces of the NCCs or NCC particles. Introducing negative or positive electrostatic charges on the surface of NCCs or NCC particles may allow for better dispersion in the desired solvent or medium.

Modification, such as surface-only modification, of the NCC or NCC particles, may be performed by a variety of methods, including, for example, esterification, etherification, acetylation, silylation, oxidation, polymer grafting on the surface, functionalization with various chemical moieties (such as a hydrophobic group to improve compatibility with hydrocarbons and/or oil), and noncovalent surface modification, including the use of adsorbing surfactants and polymer coating, as desired. In embodiments, the surface functionalization process may be conducted under mild conditions such that the process does not result in any considerable degradation or decomposition of the rod-like nanocrystalline particles.

In embodiments, modification (such as surface-only modification) by grafting polymerization techniques may preserve the shape of the NCC or NCC particles. For example, the shape may be preserved by selecting a low molecular weight polymer such as a polymer with a molecular weight below about 100,000 Daltons.

In embodiments, chemical modifications may involve electrophiles that are site-specific when reacting with hydroxyl groups on NCC or NCC particle surfaces. For example, such electrophiles may be represented by a general formula such as, for example, RX, where "X" is a leaving group that may include a halogen, tosylate, mesylate, alkoxide, hydroxide or the like, and "R" may contain alkyl, silane, amine, ether, ester groups and the like. In embodiments, surface functionalization with such electrophiles may be performed in a manner that does not decrease the size or the strength of the NCC or NCC particle.

In some embodiments, the NCC or NCC particle surfaces may have a surface functionalization between about 5 and about 90 percent, or about 25 and about 75 percent, or about 40 and about 60 percent. In some embodiments, between about 5 and about 90 percent of the hydroxyl groups on NCC or NCC particle surfaces may be chemically modified, or about 25 and about 75 percent, or about 40 and about 60 percent.

Fourier Transform Infrared (FT-IR), Raman spectroscopies or other known methods may be employed to assess the percent surface functionalization, for example via investigation of vibrational modes and functional groups present on the NCC or NCC particles. Additionally, analysis of the local chemical composition of the cellulose, NCC or NCC particles may be carried out using energy-dispersive X-ray spectroscopy (EDS). The bulk chemical composition may be determined by elemental analysis (EA). Zeta potential measurements may be used to determine the surface charge and density. Thermogravimetric analysis (TGA) and differential scanning calorimetry (DSC) may be employed to understand changes in heat capacity and thermal stability.

For each aspect, the water may be fresh water, sea water, brine or produced water. The brine salts may include halide salts including sodium chloride, potassium chloride, cesium chloride, sodium bromide, potassium bromide or cesium bromide or combinations thereof. The halide salt concentration may vary between about 0.5 wt % and a saturated halide salt solution.

For each aspect, the water soluble polymer may comprise a polysaccharide or a synthetic polyelectrolyte or both. The synthetic polyelectrolyte may comprise polyacrylic acid (PAA), polyacrylamide (PAM), partially-hydrolyzed polyacrylamide (PHPA), 2-acrylamido-2-methylpropane sulfonic acid (AMPS), polystyrene sulfonate (PSS) or polyethylenimine (PEI) or combinations thereof. The polysaccharide may comprise carboxymethyl cellulose, carboxymethyl hydroxyethyl cellulose, hydroxyethyl cellulose, hydroxypropyl cellulose, guar, hydroxypropyl guar or carboxymethyl hydroxypropyl guar, welan gum, diutan, gellan, xanthan gum, alginate or chitosan or combinations thereof.

The polysaccharide may comprise carboxymethyl cellulose (CMC). The CMC may be present in the composition at a concentration between 0.001 wt % and 1.0 wt %, or 0.01 wt % and 0.5 wt %, or 0.1 wt % and 0.3 wt %. The CMC molecular weight may be between 100 kDa and 2,000 kDa, or 300 kDa and 1,500 kDa, or 500 kDa and 1,000 kDa.

For each aspect, the composition may further comprise a weighting agent, hollow spheres, a clay, a surfactant, a solvent or an antifoam agent of a combination thereof. The weighting agent may comprise calcium carbonate, hematite, ilmenite, hausmannite or barite or combinations thereof. The density of the spacer may vary from about 1,140 kg/m$^3$ and 2,880 kg/m$^3$ (9.5 lbm/gal and 24 lbm/gal).

For each aspect, the surfactant may be anionic, cationic, non-ionic or zwitterionic. Suitable non-ionic surfactants may include nonionic surfactants may comprise long chain alcohols, ethoxylated alcohols, polyoxyethylene glycol alkyl ethers, polyoxypropylene glycol alkyl ethers, glucoside alkyl ethers, polyoxyethylene glycol octylphenol ethers, polyoxyethylene glycol alklyphenol ethers, glycerol alkyl esters, polyoxyethylene glycol sorbitan alkyl esters, sorbitan alkyl esters, cocamide DEA, cocamide MEA, dodecyldimethylamine oxide, block copolymers of polyethylene glycol or polypropylene glycol, or polyethoxylated tallow amine or combinations thereof Suitable anionic surfactants may include ammonium lauryl sulfate, sodium lauryl sulfate, sodium laureth sulfate, sodium myreth sulfate, dioctyl sodium sulfosuccinate, perfluorooctane sulfonates, perfluorobutanesulfonates, alkylbenzene sulfonates, alkyl-aryl ether phosphates, alkyl ether phosphates, alkyl carboxylates, sarcosinates, perfluorononanoates, or perfluorooctanoates or combinations thereof. Suitable zwitterionic surfactants may include sultaines or betaines or combinations thereof. The surfactant may be 3-[(3-Cholamidopropyl)dimethylammonio]-1-propanesulfonate, cocamidopropyl hydroxysultaine, or cocamidopropyl betaine or a combination thereof. The surfactant may be present in the composition at a concentration between 0.2 wt % and 15 wt %, or between 1.0 wt % and 10 wt %, or between 2.0 wt % and 5.0 wt %.

For each aspect, suitable solvents may include methanol, ethanol, ethylene glycol, propylene glycol, isopropanol or 2-butoxyethanol or a combination thereof. The mutual solvent may be 2-butoxyethanol. The mutual solvent may be present at a concentration between 1.0 wt % and 20 wt %, or between 3.0 wt % and 15 wt %, or between 5.0 wt % and 10 wt %.

For each aspect, the antifoam agent may be a polyglycol ether, a silicone or both. The antifoam agent may be present in the composition at concentrations between 0.01 wt % and 2.0 wt %, or between 0.03 wt % and 1.0 wt %, or between 0.05 wt % and 0.08 wt %.

For the aspect pertaining to treating a subterranean well, the composition may be a spacer fluid, and displace and remove a drilling fluid from the subterranean well. As previously discussed, one objective of the present disclosure concerns the prevention of commingling between a cement slurry and a drilling fluid. However, skilled persons will recognize that in certain environments (e.g., deviated or horizontal wells), some commingling may be unavoidable. In such cases, the amount of commingling may be limited to 10 vol % or less.

For the aspect pertaining to cleaning tubular and formation surfaces in a subterranean well, tubulars may be drillpipe, casing, liner or coiled tubing or combinations thereof. Residual deposits on the tubular or formation surfaces may be drilling fluids, completion fluids, or lost circulation materials or combinations thereof. At least 95% of residual deposits may be removed from the tubular or formation surfaces as the composition is circulated in the wellbore and flows past the tubular and formation surfaces.

Skilled persons will recognize that the use of the compositions disclosed herein may not be limited to spacer fluids. The disclosed compositions may be used in other applications where stable suspension of solids is desired. Such applications may include gravel pack fluids, well cleanout fluids, drilling fluids and pills.

The foregoing is further illustrated by reference to the following examples, which are presented for purposes of illustration and are not intended to limit the scope of the present disclosure.

EXAMPLES

The following materials were used for preparation of example spacer fluids: pulp fiber (length: 1-7 mm; diameter: ≈40 μm), CNF (length 2-2,000 μm; diameter: 5 nm-20 μm), CMC (MW=700,000), guar gum, polyacrylamide, barite and hematite.

Example 1

As a comparative test, a 1-wt % aqueous pulp fiber suspension was agitated in a Waring blender for 5 minutes at 2,000 RPM. After mixing, the pulp fibers immediately began to agglomerate and form flocs. A second suspension was mixed in the same manner that contained 1 wt % pulp fiber and 0.2 wt % CMC. No evidence of flocculation was seen when, according to the present disclosure, a cellulosic fiber and a water soluble polymer were both present.

Example 2

Three aqueous suspensions were prepared in a Waring blender as described in Example 1: (1) 0.5 wt % CNF (comparative test); (2) 0.5 wt % CNF, 0.2 wt % CMC; and (3) 0.5 wt % CNF, 0.2 wt % CMC, 3 wt % KCl. 40 mL of each suspension were placed in a centrifuge and spun for 15 minutes at 3,000 RPM. The fibers separated completely from the water during the comparative test (Fluid 1). In accordance with the present disclosure, no fiber separation was observed in either Fluid 2 or Fluid 3. Fluid 3 demonstrated that the presence of an electrolyte did not affect the result.

Example 3

Figure 1B:
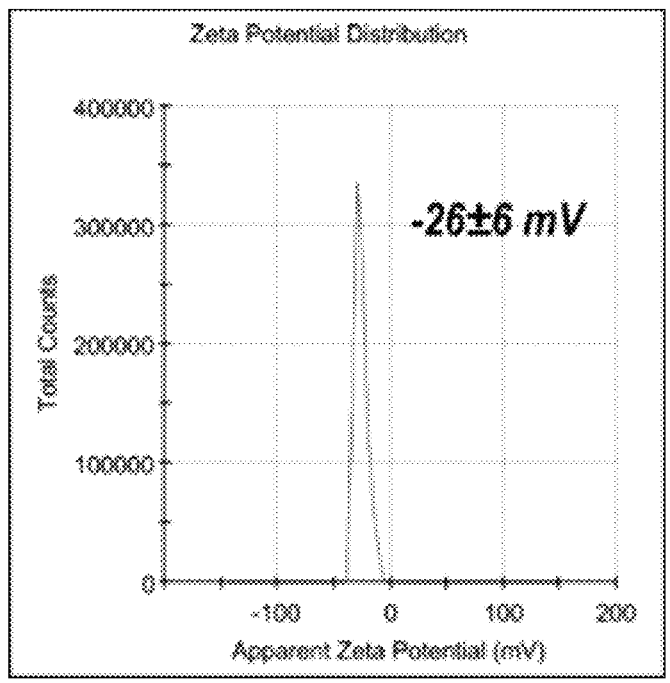
Figure 2A:
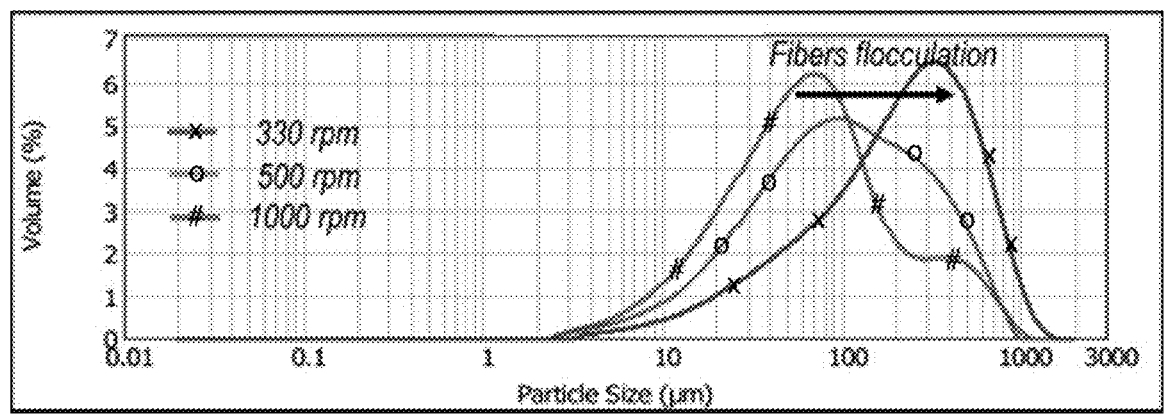
FIGS. 2a-2d are plots showing the particle size distributions of cellulose fibers in fluids at various shear rates. The fluids contain cellulose fibers alone (FIG. 2a) and in the presence of carboxymethyl cellulose (FIG. 2b), guar gum (FIG. 2c) and polyacrylamide (FIG. 2d).
Figure 2B:
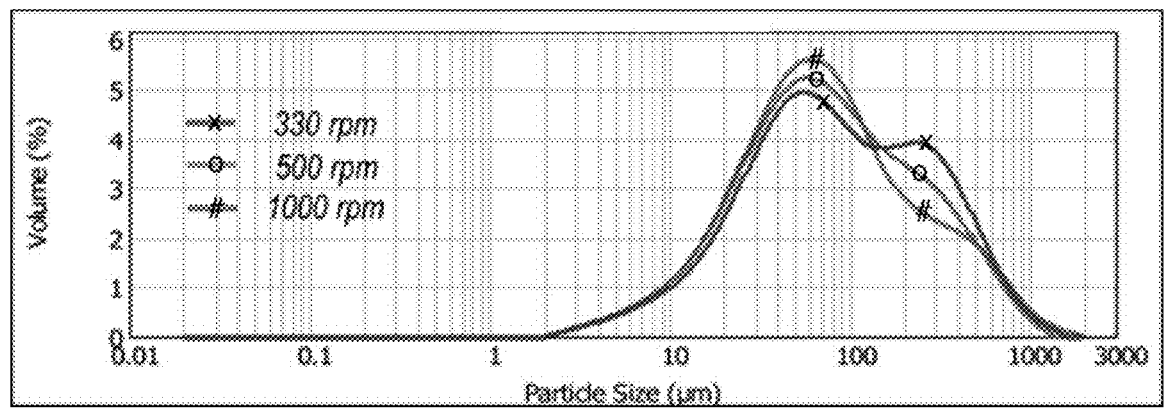
Figure 2C:
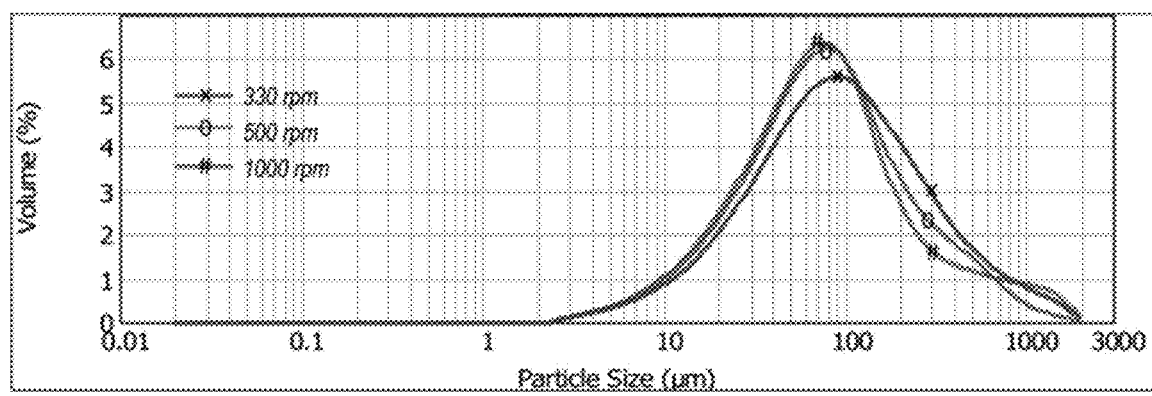
Figure 2D:
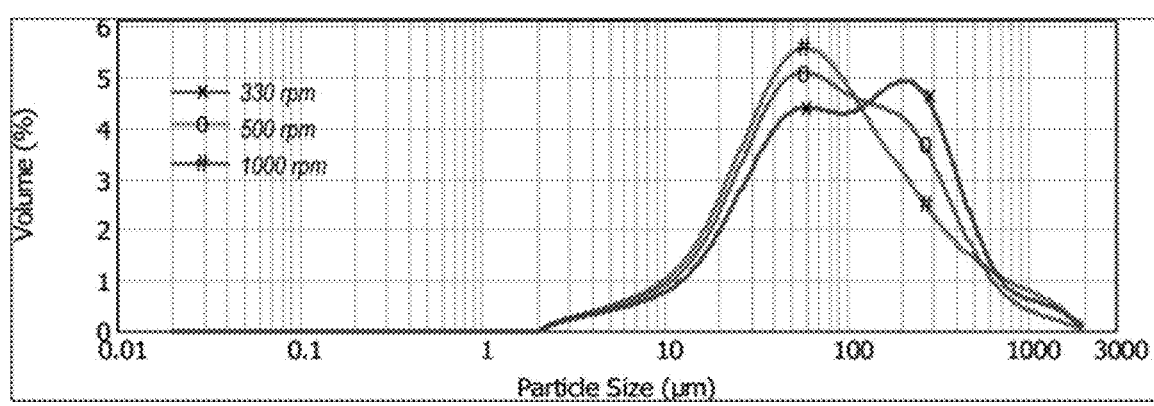

The zeta potential distributions were measured for two fluids: (1) 0.1 wt % CNF in water (comparative test); and (2) 0.1 wt % CNF, 0.02 wt % CMC in water. The zeta potential plots are shown in FIGS. 1a and 1b. FIG. 1a shows that the CNF fibers are almost neutral when present alone. FIG. 1b shows that the presence of CMC causes the fibers to be negatively charged. Without wishing to be held to any theory, the inventors believe the negative surface charge causes the fibers to repel one another, hindering their agglomeration.

Example 4

Experiments were conducted to measure the sizes of CNF fibers under dynamic conditions. A Mastersizer™ 2000 particle size analyzer, available from Malvern Instruments, Ltd., was used to generate particle-size distribution curves at three rotational speeds (330, 500 and 1,000 RPM). The analyzer is equipped with an overhead mixer that circulates the test fluid through the optical cell. Particle size analyses were performed with four fluids: (1) 0.1 wt % CNF in water (comparative); (2) 0.1 wt % CNF, 0.02 wt % CMC in water; (3) 0.1 wt % CNF; 0.05% guar gum in water; and (4) 0.1 wt % CNF, 0.01 vol % polyacrylamide in water. The results are shown in FIGS. 2a-2d.

In the absence of CMC (FIG. 2a), the particle size distribution of the CNF fibers was more highly sensitive to the rotational speed. At 330 RPM, the CNF fibers were flocculated as evidenced by the peak at a higher particle size. At 1,000 RPM, the CNF fibers became deflocculated and the average particle size decreased. In the presence of CMC (FIG. 2b), guar (FIG. 2c) and polyacrylamide (FIG. 2d), the fiber suspension remained well dispersed at 330 RPM.

Example 5

Figure 3A:
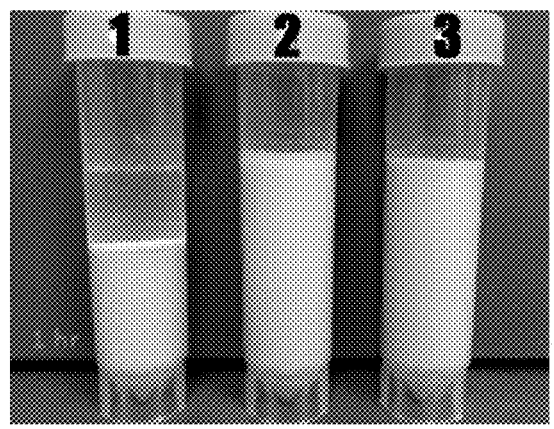
FIGS. 3a and 3b are photographs showing the effect of combining cellulose nanofibers and carboxymethyl cellulose on spacer fluid stability.
Figure 3B:
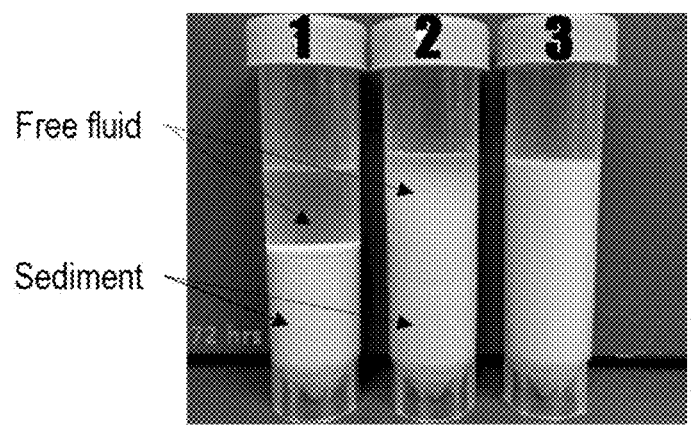

Three aqueous spacer fluids were prepared at a density of 1,920 kg/m$^3$ (16.0 lbm/gal). The base spacer composition was 1,140 kg/m$^3$ (420 lbm/bbl) barite, 24 L/m$^3$ (1 gal/bbl) surfactant (a mixture of coco fatty acid, diethanolamine salt and alcohol ethoxylate) and 2.4 L/m$^3$ (0.1 gal/bbl) silicone antifoam agent. The spacers contained 0.5 wt % CNF (Fluid 1; comparative test), or 0.2 wt % CMC (Fluid 2; comparative test), or 0.5 wt % CNF and 0.2 wt % CMC (Fluid 3). After mixing in a Waring blender for 5 minutes at 4,000 RPM, the spacer fluids were left static for 72 hours at ambient temperature (FIGS. 3a and 3b). The specific results are shown below in Table 1.

TABLE 1

| Spacer composition | | 1 | 2 | 3 |
|---|---|---|---|---|
| 1 hr | Free fluid | 14 ml | 1 ml | 0 |
|  | Sediment | 21 ml | 0 | 0 |
| 72 hrs | Free fluid | 14 ml | 20 ml | 0 |
|  | Sediment | 21 ml | 18 ml | 0 |

At the end of the static period, Fluid 1 displayed a clear layer of free fluid; Fluid 2 displayed sedimentation (i.e., the particle density at the top of the fluid column was lower than that at the bottom; and Fluid 3 was the sole fluid that remained stable and did not show signs of particle sedimentation.

Example 6

Figures 4A, 4B, 4C:
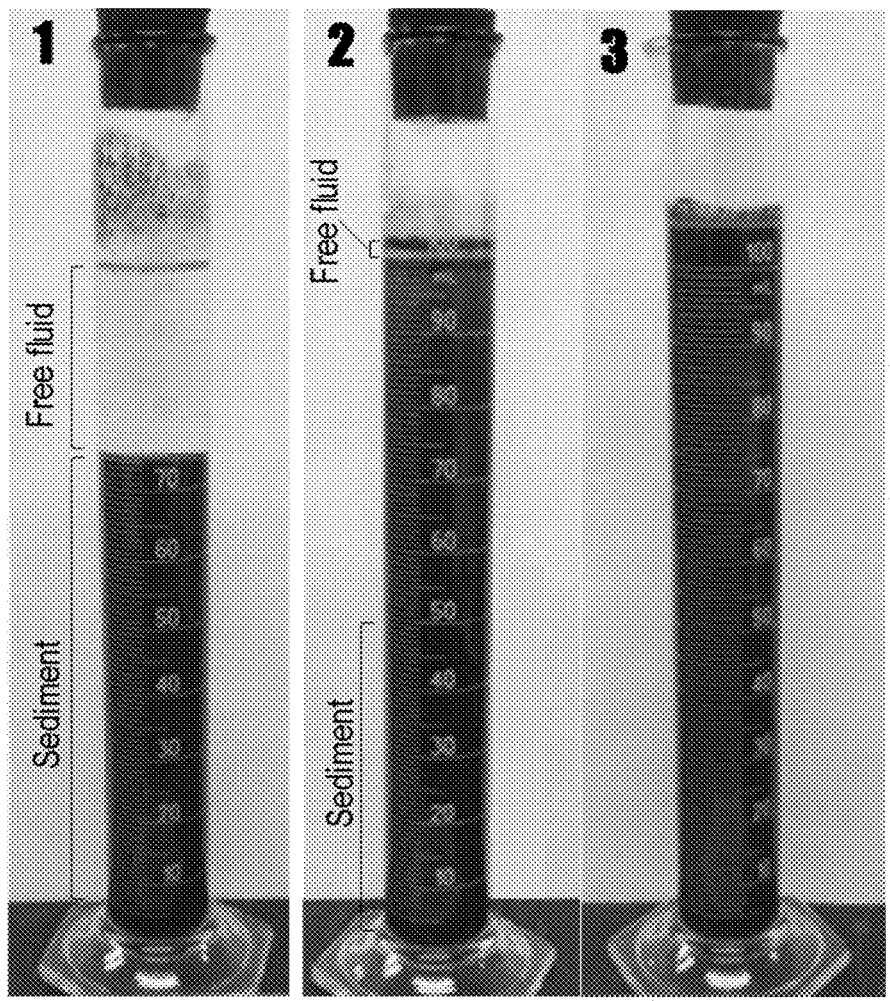
FIGS. 4a-4c photographs showing the effects of combining cellulose nanofibers and carboxymethyl cellulose on spacer fluid stability.

Three aqueous spacer fluids were prepared at a density of 1,920 kg/m$^3$ (16.0 lbm/gal). The base spacer composition was 1,130 kg/m$^3$ (397 lbm/bbl) hematite, 24 L/m$^3$ (1 gal/bbl) surfactant (a mixture of coco fatty acid, dethanolamine salt and alcohol ethoxylate) and 2.4 L/m$^3$ (0.1 gal/bbl) silicone antifoam agent. The spacers contained 0.5 wt % CNF (Fluid 1; comparative), or 0.2 wt % CMC (Fluid 2), or 0.5 wt % CNF and 0.2 wt % CMC (Fluid 3). After mixing in a Waring blender for 5 minutes at 4,000 RPM, the spacer fluids were placed in an atmospheric consistometer and conditioned for 30 minutes at 85° C. (185° F.). Then the spacers were poured into 100-mL graduated cylinders, placed in an 85° C. oven and left static for 2 hours. At the end of the static period, Fluid 1 showed phase separation (25% free fluid; i.e., clear fluid from 75 mL to 100 mL) (FIG. 4a). Fluid 2 displayed particle segregation—the hematite had settled to the bottom, up to about 50 mL (FIG. 4b). Fluid 3, prepared according to the present disclosure, remained stable and did not show signs of particle segregation or sedimentation (FIG. 4c). The specific details are described below in Table 2.

|  | 1 | 2 | 3 |
|---|---|---|---|
| Free fluid | 25 ml | 2 ml | trace |
| Sediment | 75 ml | 50 ml | 0 ml |

Although a few example embodiments have been described in detail above, those skilled in the art will readily appreciate that many modifications are possible in the example embodiments without materially departing from this disclosure. Accordingly, each such modification is intended to be included within the scope of this disclosure as defined in the following claims.

The invention claimed is:

1. A method for treating a subterranean well, comprising:
    (i) preparing a spacer fluid composition, having a density between about 1920 kg/m$^3$ and 2880 kg/m$^3$, that comprises water, a plurality of weighting agent particles, a water soluble polymer, and cellulose fibers; and
    (ii) placing the composition in the well,
    wherein, when left static, the composition exhibits less than about 1 percent free fluid and no sedimentation.

2. The method of claim 1, wherein the composition displaces and removes a drilling fluid from the subterranean well.

3. The method of claim 1, wherein the water soluble polymer comprises a polysaccharide or a synthetic polyelectrolyte or both.

4. The method of claim 3, wherein the polysaccharide comprises carboxymethyl cellulose, the carboxymethyl cellulose having a molecular weight between 100 kDa and 2000 kDa, and being present at a concentration between 0.001 wt % and 1 wt %.

5. The method of claim 1, wherein the cellulose fibers have lengths between 100 nm and 10 mm, and diameters between 4 nm and 40 μm.

6. The method of claim 1, wherein the composition further comprises a halide salt.

7. The method of claim 1, wherein the composition further comprises a surfactant, a clay, a solvent or an antifoam agent or a combination thereof.

8. A method for cementing a subterranean well, comprising:
    (i) preparing a spacer fluid composition, having a density between about 1920 kg/m$^3$ and 2880 kg/m$^3$, that comprises water, a plurality of weighting agent particles, a water soluble polymer, and cellulose fibers;
    (ii) placing the composition in the well; and
    (iii) placing a cement slurry in the well,
    wherein the composition separates the cement slurry and a drilling fluid, and
    wherein, when left static, the composition exhibits less than about 1 percent free fluid and no sedimentation.

9. The method of claim 8, wherein the drilling fluid is water-base, oil-base, synthetic-base or an emulsion.

10. The method of claim 8, wherein the water soluble polymer comprises a polysaccharide or a synthetic polyelectrolyte or both.

11. The method of claim 10, wherein the polysaccharide comprises carboxymethyl cellulose, the carboxymethyl cellulose having a molecular weight between 100 kDa and 2000 kDa, and being present at a concentration between 0.001 wt % and 1 wt %.

12. The method of claim 8, wherein the cellulose fibers have lengths between 100 nm and 10 mm, and diameters between 4 nm and 40 μm.

13. The method of claim 8, wherein the composition further comprises a halide salt.

14. The method of claim 8, wherein the composition further comprises a surfactant, a clay, a solvent or an antifoam agent or a combination thereof.

15. A method for cleaning tubular and formation surfaces in a subterranean well, comprising:
   (i) preparing a spacer fluid composition, having a density between about 1920 kg/m$^3$ and 2880 kg/m$^3$, that comprises water, a plurality of weighting agent particles, a water soluble polymer, and cellulose fibers;
   (ii) placing the composition in the well such that it flows past tubular and formation surfaces, thereby removing residual deposits and leaving the tubular and formation surfaces water wet; and
   (iii) removing the composition from the well,
   wherein, when left static, the composition exhibits less than about 1 percent free fluid and no sedimentation.

16. The method of claim 15, wherein the water soluble polymer comprises a polysaccharide or a synthetic polyelectrolyte or both.

17. The method of claim 16, wherein the polysaccharide comprises carboxymethyl cellulose, the carboxymethyl cellulose having a molecular weight between 100 kDa and 2000 kDa, and being present at a concentration between 0.001 wt % and 1 wt %.

18. The method of claim 15, wherein the cellulose fibers have lengths between 100 nm and 10 mm, and diameters between 4 nm and 40 μm.

19. The method of claim 15, wherein the composition further comprises a halide salt.

20. The method of claim 15, wherein the composition further comprises a surfactant, a clay, a solvent or an antifoam agent or a combination thereof.

* * * * *